United States Patent [19]
Morioka

[11] Patent Number: 5,510,973
[45] Date of Patent: Apr. 23, 1996

[54] BUFFER STORAGE CONTROL SYSTEM

[75] Inventor: Tetsuya Morioka, Kawasaki, Japan

[73] Assignee: Fujitsu Limited, Kanagawa, Japan

[21] Appl. No.: 39,008

[22] PCT Filed: Aug. 13, 1992

[86] PCT No.: PCT/JP92/01035

§ 371 Date: Apr. 9, 1993

§ 102(e) Date: Apr. 9, 1993

[87] PCT Pub. No.: WO93/04431

PCT Pub. Date: Apr. 3, 1992

[30] Foreign Application Priority Data

Aug. 15, 1991 [JP] Japan ................. 3-204522

[51] Int. Cl.⁶ ............................. G05B 15/00; G06F 13/24
[52] U.S. Cl. ................. 364/134; 395/428; 364/228.1; 364/228.3; 364/231.8; 364/243.42; 364/DIG. 1
[58] Field of Search ................. 395/425, 400; 364/131–134, 200 MS File

[56] References Cited

U.S. PATENT DOCUMENTS

| | | | |
|---|---|---|---|
| 4,733,344 | 3/1988 | Watanabe et al. | 395/375 |
| 5,097,414 | 3/1992 | Tone | 395/425 |
| 5,168,560 | 12/1992 | Robinson et al. | 395/425 |
| 5,197,145 | 3/1993 | Kitamura et al. | 395/425 |
| 5,202,972 | 4/1993 | Gusefshi et al. | 395/425 |
| 5,226,133 | 6/1993 | Taylor et al. | 395/400 |
| 5,261,057 | 11/1993 | Coyle et al. | 395/275 |
| 5,377,341 | 12/1994 | Kaneko et al. | 395/425 |
| 5,426,749 | 6/1995 | Morioka | 395/400 |

FOREIGN PATENT DOCUMENTS

| | | |
|---|---|---|
| 59-22315 | 5/1984 | Japan. |
| 59-218692 | 12/1984 | Japan. |
| 62-80742 | 4/1987 | Japan. |

Primary Examiner—Roy N. Envall, Jr.
Assistant Examiner—Thomas E. Brown
Attorney, Agent, or Firm—Nikaido, Marmelstein, Murray & Oram

[57] ABSTRACT

In a buffer storage control system for controlling a buffer storage based on a part of a page address of a logical address and a part of a byte index of the logical address which is used as a line address, the system includes: a tag portion TAG1 (13, 17) provided in a plurality of pipe lines (IF, OP) of a central processing unit CPU (1) to retrieve a hit/mis-hit of data based on a part of the page address of the logical address and a part of the byte address of the logical address which is used as the basic line address; a data portion DATA (14, 18) for holding data when retrieving the tag portion TAG1 by the basic line address and when the data is hit; and a tag portion TAG2 (21, 22) provided in a MCU, when the data is mis-hit by using the basic line address, to retrieve the hit/mis-hit of data by using a synonymic line address which is obtained by changing a variable portion of the basic line address; wherein, in a data access, the tag portion TAG1 is retrieved by using only the basic line address, when the data is hit using the tag portion TAG1, the data portion DATA is accessed, on the other hand, when the data is mis-hit using tap portion TAG1, the tag TAG2 is retrieved by using the basic line address and the synonymic line address, further, when the data is hit using tap portion TAG2, the data portion DATA is invalidated, a move-out operation is invalidated, and a move-in operation is validated.

1 Claim, 13 Drawing Sheets bit 18~25 : line address for accessing buffer storage

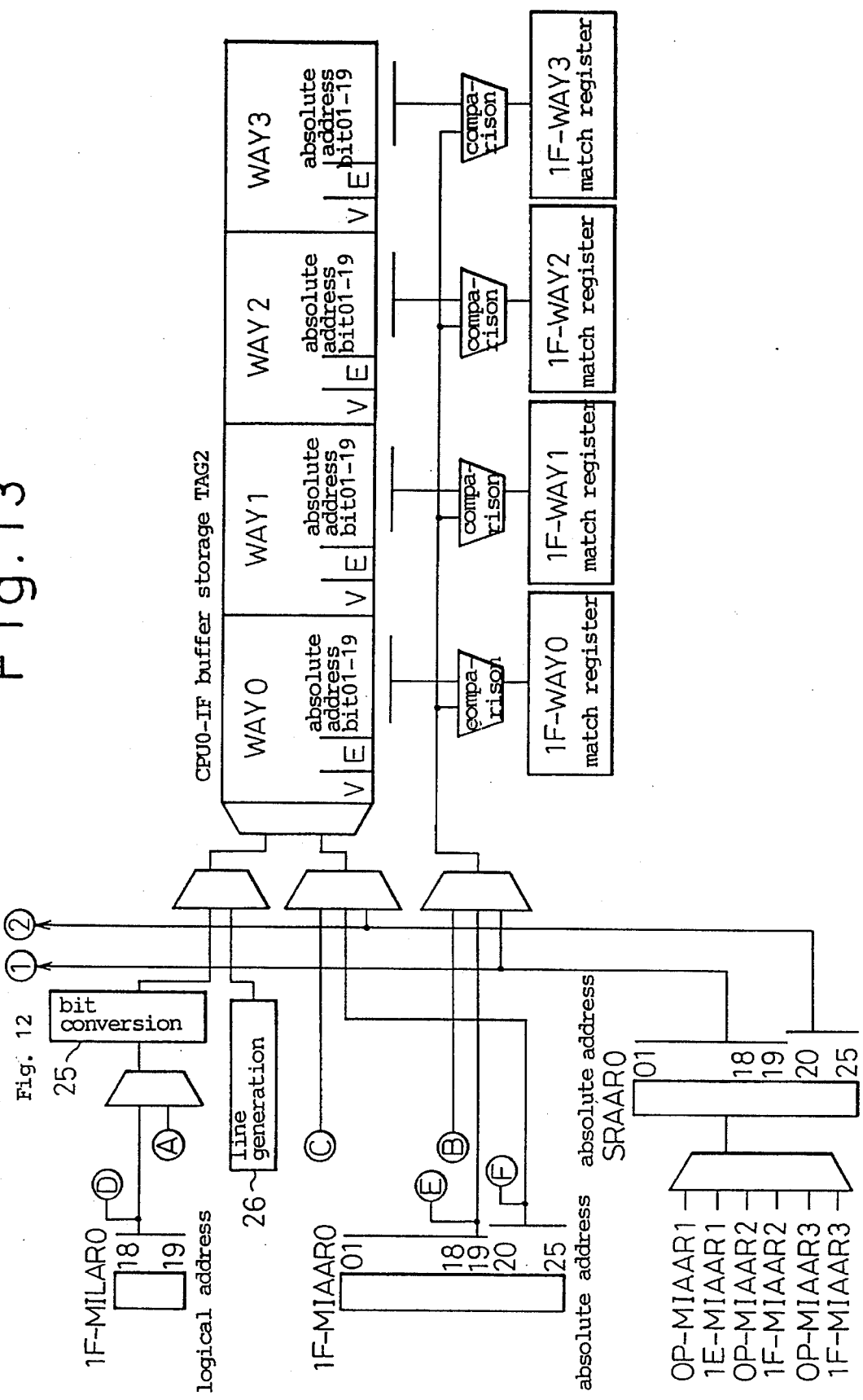

BUFFER STORAGE CONTROL SYSTEM

TECHNICAL FIELD

The present invention relates to a buffer storage control system for controlling a buffer storage based on a) part of a page address of a logical address and b) a part of a byte index of the logical address which is used as a line address.

BACKGROUND ART

A data processing apparatus includes a buffer storage having high speed and small capacity memory elements used in a central processing unit (CPU). On the other hand, a main storage includes low speed and large capacity memory elements. Data blocks, which are separated in the main storage, are copied and stored in the buffer storage so that it is possible to achieve high speed access from the central processing unit to the main storage by accessing the data blocks copied into the buffer storage.

In general, a set associative method is utilized for a mapping operation from the main storage to the buffer storage. In this method, a plurality of WAYs are provided on a line which is accessed by a part of an address of the data block. The data and the block address except for bits used in the line address, are registered on the WAY. In the buffer storage, a space which stores the data is called a data portion (DATA), and a space which stores the block address is called a tag portion (TAG).

Further, there is a store-in method as a control method of the buffer storage. In this method, when there is no object data for a fetch access and store access to the buffer storage, the data block including the object data is moved from the main storage to the buffer storage (i.e., move-in operation MI). When performing the fetch access, the object data in the buffer storage is transferred from the data block in the main storage to an access source. When performing the store access, the object data is stored in the buffer storage. When the object block for the move-in operation is a data block which was stored in the past, or when another calculation device sharing the main storage requires use of the data block which was stored in the past, the object block is moved from the buffer storage to the main memory (i.e. move-out operation MO).

On the other hand, there are two kinds of addresses for accessing the buffer storage, i.e., one is a method of using only a part of a byte index of a logical address, and the other is a method of using both a part of a page address of the logical address and a part of the byte index of the logical address. The present invention relates to a buffer control storage system using the latter.

In this case, the logical address is used as an address for accessing from a calculation control unit to a main storage unit, and there are two types of addresses in accordance with a state of the calculation control unit. One is a real address, and this address is converted to an absolute address to access the main memory by means of a prefix conversion means using a prefix-register. The other is a virtual address, and this address is converted to the absolute address by means of an address conversion means using an address conversion table.

In both address types, the address is divided into the page address for an upper portion of the address and the byte index for a lower portion of the address. Further, before and after the prefix conversion or address conversion, values in the byte index are not changed, and values in the page address are changed. For example, when address bits are given by 01 to 31 and a page size is given by 4 Kbytes, 19 bits (01 to 19) denote the page address portion, and 12 bits (20 to 31) denote the byte index portion.

Further, the central processing unit simultaneously accesses the address conversion buffer and the TAG portion of the buffer storage to achieve high speed pipe-line processing. In this case, the TAG portion cannot be accessed by using the absolute address which is obtained as a result of the retrieval for the address conversion buffer. Accordingly, in general, a part of the byte address of the logical address is used as the line address for the buffer storage.

When the page size is given by 4 Kbytes and the block size is given by 64 bytes, the logical address which can be used as the line address for the buffer storage is given by bits 20 to 25 so that it becomes 64 bytes×64 bytes=4 Kbytes per one way (WAY). In this method, the number of the WAY is increased to increase capacity of the buffer storage. However, when increasing the number of the WAY, it is necessary to increase the number of the comparison circuits for comparing the absolute address obtained by the address conversion buffer with the absolute address obtained by the TAG portion, or to increase the number of the selection circuits for selecting data of each WAY read from the DATA portion.

As another method of increasing the number of lines without increasing of the number of the WAY, both a part of the byte address of the logical address and a part of the page address are used as the line address for the buffer storage. In this case, depending on values of the prefix-register or the address conversion table, the block having the same absolute address may be registered on different lines of the buffer storage. For example, when the page size is given by 4 Kbytes and the block size is given by 64 bytes, and when bits 18 to 25 of the logical address are used as the line address of the buffer storage, the block having the same absolute address may be registered on four lines since bits 18 and 19 are variable for the logical address and the absolute address. This is well-known as a problem of a synonymity to persons skilled in the art.

In the present invention, a line address, which is shown by the logical address bit and applied as an address requested, is called a basic line address. Further, a line address, which is obtained by change of bits of the page address, is called a synonymic line address. In the central processing unit having the buffer storage and using the store-in method, a part of the page address and a part of the byte index are given as the line address so that the present invention can effectively control the buffer storage.

DISCLOSURE OF THE INVENTION

In a buffer storage control system for controlling a buffer storage based on a part of a page address of a logical address and a part of a byte index of the logical address by using as a line address, one aspect of the present invention includes:

a tag portion TAG1 provided for a plurality of pipe lines in a central processing unit CPU to retrieve a hit/mis-hit of data based on a part of the page address of the logical address and a part of the byte address of the logical address as the basic line address, a data portion DATA for holding data when retrieving the tag portion TAG1 by the basic line address and when the data is hit, and a tag portion TAG2 provided in the main control unit MCU, when the data is mis-hit by using the basic line address, to retrieve the hit/mis-hit of data by using the synonymic line address which is obtained by changing a variable portion of the basic line address, wherein, in a data access operation, the tag portion TAG1 is retrieved by using only the basic line address, when data is hit using tag portion TAG1, the data portion DATA is accessed, on the other hand, when data is not hit using the tag portion TAG1, the tag portion TAG2 is retrieved by using the basic line address and the synonymic line address, further, when data is hit using tag portion TAG2, the data portion DATA is invalidated, or the move-out operation is invalidated, further, the move-in operation is validated.

As one embodiment, a plurality of pipe lines are formed by pipe lines for instruction access (IF pipe line) and pipe lines for operand access (OP pipe line), the variable portion of the basic line address is given by bits 18 and 19 of the page address portion.

Further, as another embodiment of the present invention, in a data processing apparatus formed by a plurality of central processing units (CPU), a main storage unit (MSU), and a main storage control unit (MCU) provided between these units, the following structures are provided:

Each CPU includes a calculation control unit (I unit) for generating an instruction fetch request and an operand access request and for receiving an instruction fetch data, a calculation execution unit (E unit) for generating a store data and for receiving an operand fetch data, and a storage control unit (S unit) for receiving the instruction fetch request and the operand access request and for generating the move-in request.

The S unit includes the pipe line for the instruction access (IF pipe line) and the pipe line for operand access.

The IF pipe line includes a) an address conversion buffer (IF-TLB) for converting the logical address to the absolute address to perform the fetch access of the instruction, b) a tag portion (IF-TAG1) for retrieving data based on the basic line address when performing the fetch access for the instruction and for determining the hit/mis-hit of data, and c) a buffer storage data portion (DATA) for the instruction access to read data when it is hit.

The OP pipe line includes a) an address conversion buffer (OP-TLB) for high speed conversion from the logical address to the absolute address to perform the fetch access and store access for the operand, b) a tag portion (OP-TAG1) for retrieving based on the basic line address when performing the fetch access and the store access and for determining the hit/mis-hit of data, c) a buffer storage data unit (DATA) for the operand access to read data when it is hit, and d) a store buffer (19) for temporarily storing the store data.

The main storage control unit (MCU) includes a) a tag portion (IF-TAG2) for an instruction access to retrieve the synonymic line address when performing the fetch access of the instruction and for determining the hit/mis-hit of data, and b) a tag portion (OP-TAG2) for the operand access for retrieving the synonymic line address when performing the fetch access and the store access of the operand, and for determining the hit/mis-hit of data.

BRIEF EXPLANATION OF THE DRAWINGS

FIG. 13 is one example of the TAG2 in the MCU of a conventional art (No. 2).

BEST MODE OF CARRYING OUT THE INVENTION

Before explaining preferred embodiments of the present invention, a conventional art and its problem will be explained below.

Figure 1:
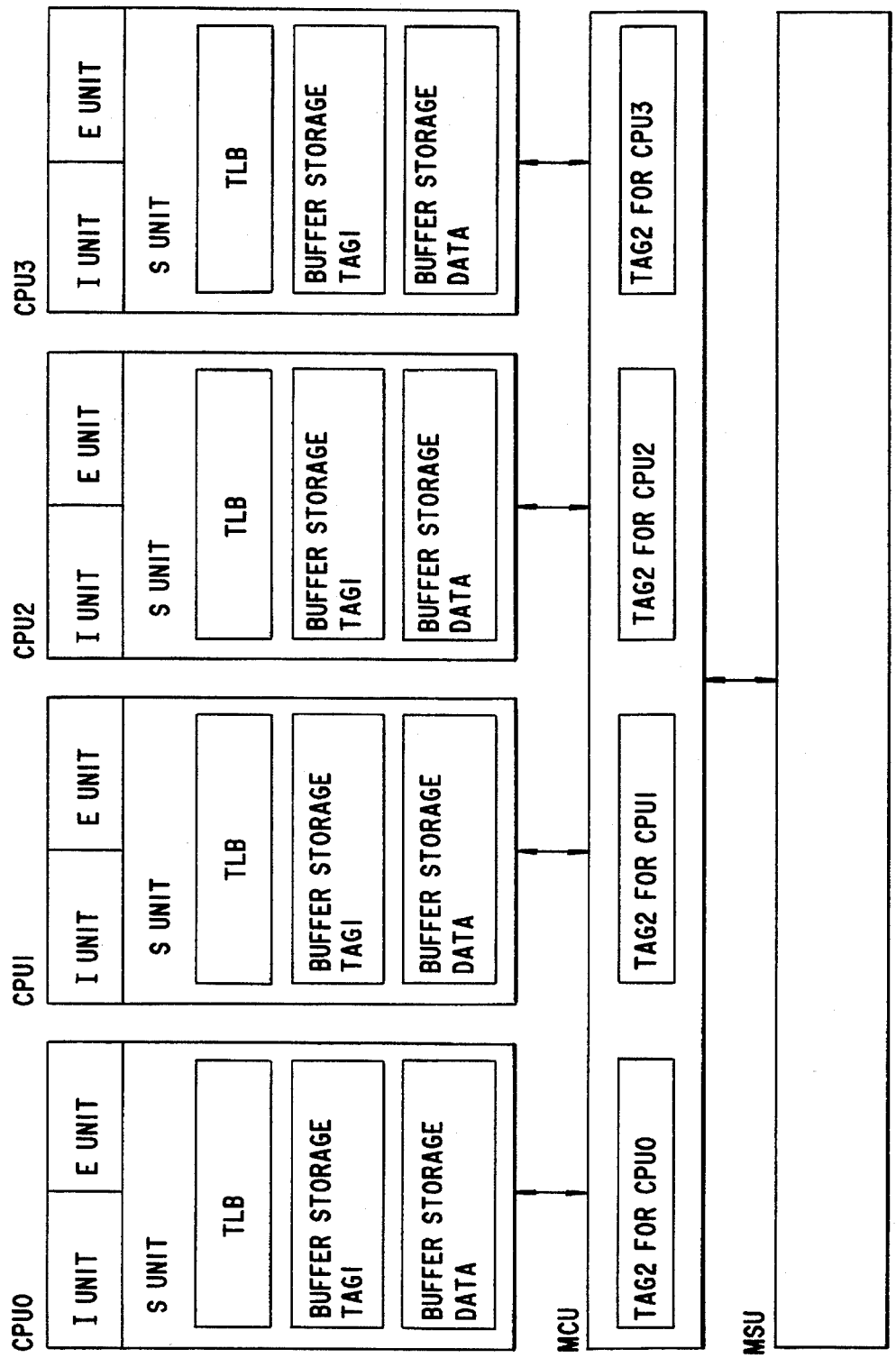
FIG. 1 is a principle block diagram of a conventional art.

FIG. 1 is a structural view of a conventional art. This drawing shows a central processing unit having one buffer storage for the store-in method which has a part of the page address and a part of the byte index as the line address. As shown in the drawing, the data processing apparatus is formed by four central processing units CPU 0 to 3, the main storage control unit MCU, and the main storage unit MSU. Each CPU includes the I unit (calculation control unit), the E unit (calculation execution unit), and S unit (storage control unit). The S unit includes the TLB (address conversion buffer), the buffer storage TAG1, and the buffer storage DATA. The MCU is formed by the TAG2 for the CPU 0 to 3 each having a copy of the buffer storage.

Figure 2:
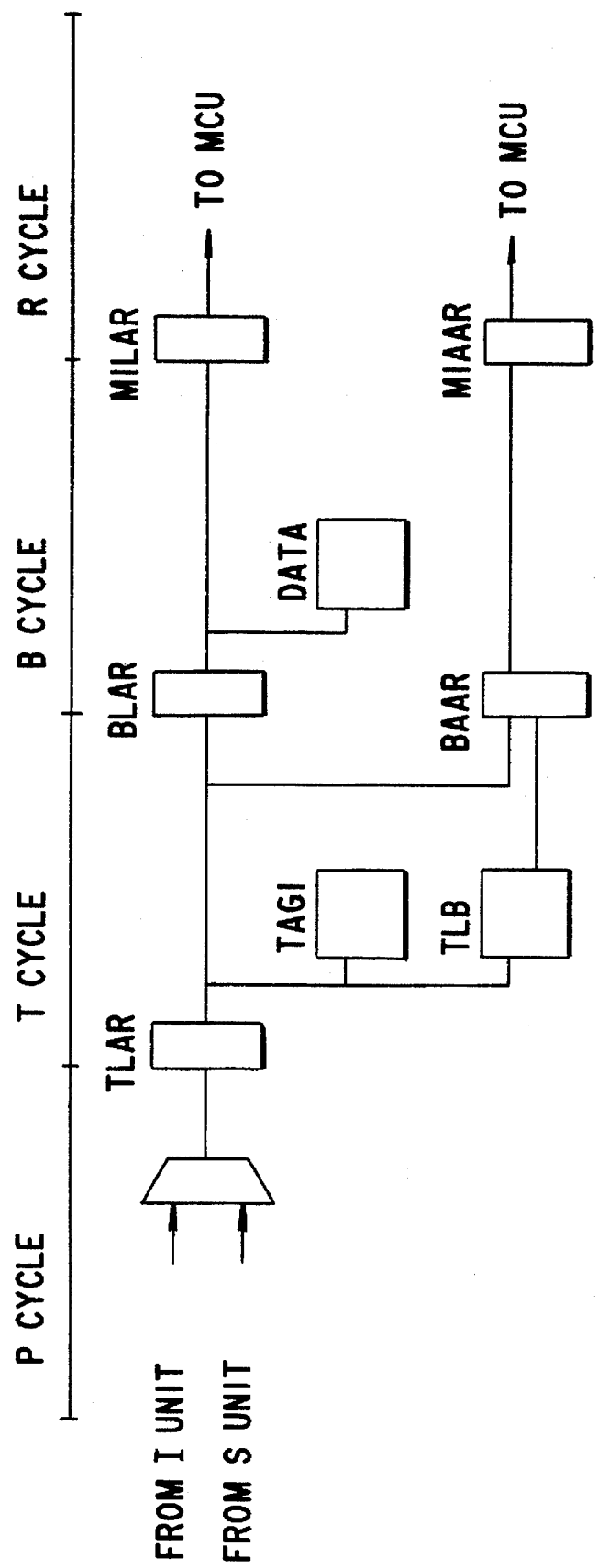
FIG. 2 is an explanatory view of operation of a conventional art.

FIG. 2 is a flowchart of the pipe line of the S unit, where, the pipe line consists of four cycles P, T, B and R. In the P cycle, the requested address is selected from either the I unit of the logical address or the S unit by using the selection circuit. In the T cycle, the logical address selected by the P cycle is input to the T cycle logical address register TLAR, and the buffer storage TAG1 and the address conversion buffer TLB are accessed by using this logical address. In the B cycle, the value (i.e. logical address) of the TLAR is input to the B cycle logical address register BLAR, and the buffer storage DATA is accessed by using this logical address.

Further, the byte index of the logical address of the register TLAR is input to the B cycle absolute address register BAAR. The absolute address, which is obtained by converting the page address of the register TLAR by using the buffer TLB, is input to the register BAAR (B cycle absolute address register). Further, in the R cycle, when the required block address does not exist on the basic line address of the TAG1, or when the type of the required block address is different, the value of the register BLAR is input to the move-in logical address register MILAR, or the value of the BAAR is input to the move-in absolute address register MIAAR. Further, the values of the MILAR and MIAAR are sent to the MCU as the address of the move-in request or block type conversion request.

Figure 3:
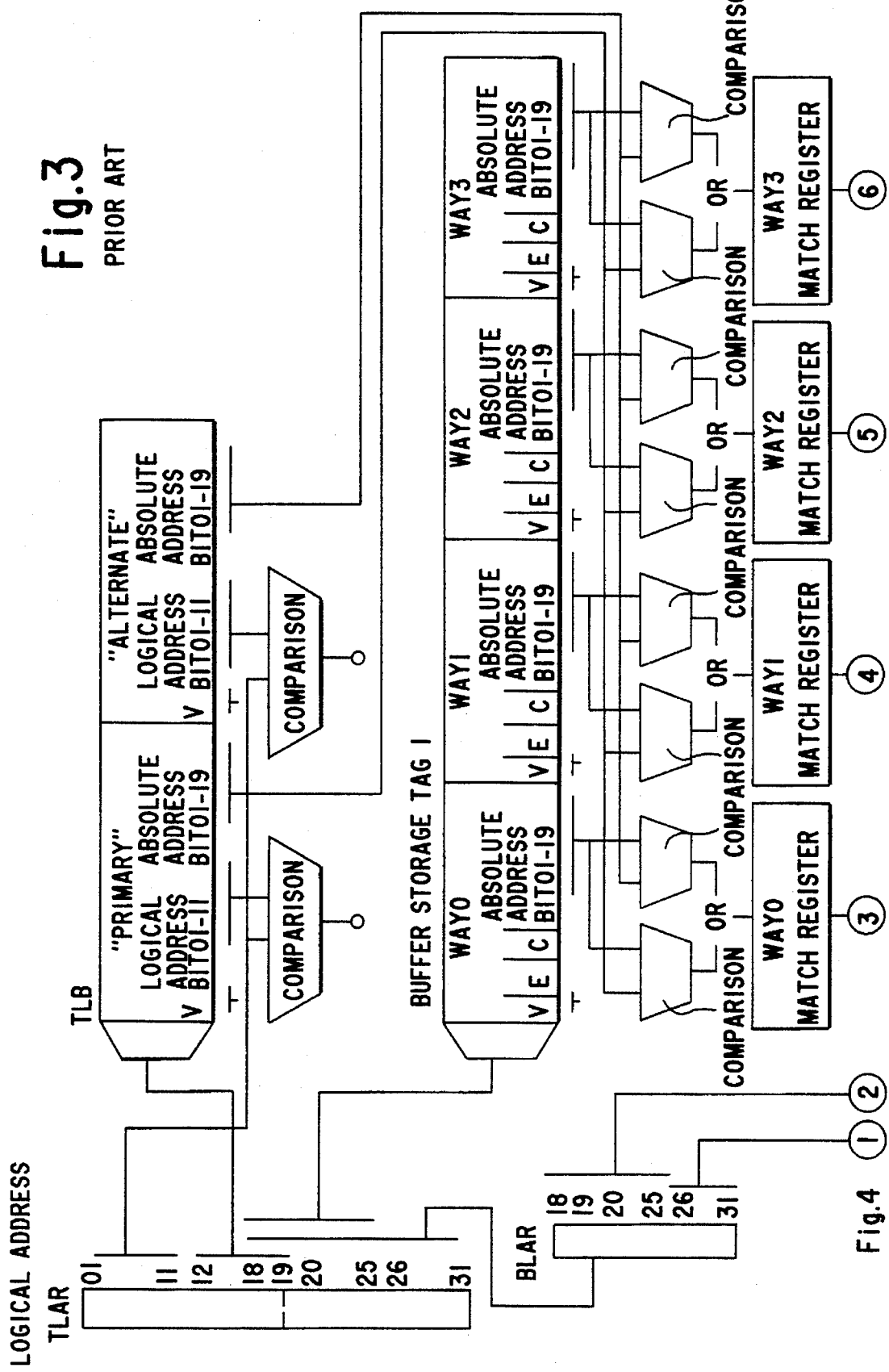
FIG. 3 is one example of TAG/DATA portions of a conventional art (No. 1)
Figure 4:
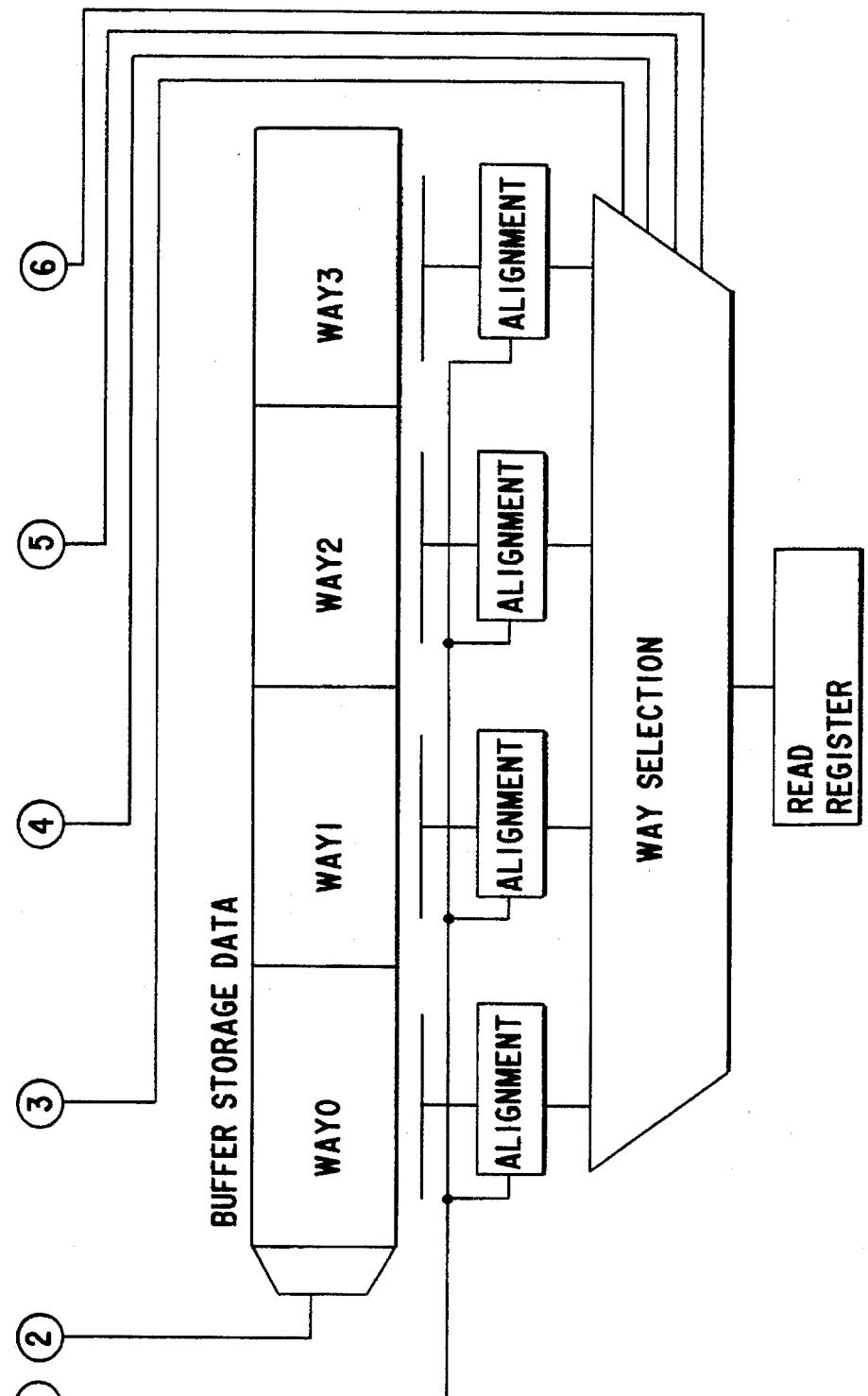
FIG. 4 is one example of TAG/DATA portions of a conventional art (No. 2)

FIGS. 3 and 4 show the address conversion buffer TLB, the buffer storage TAG1, the buffer storage DATA and the peripheral circuits. The buffer TLB consists of two WAYs of "PRIMARY" and "ALTERNATE" each entry has a valid bit (V) indicating validity of an entry, bits 01 to 11 of the logical address except for bits used as the line address, and bits 01 to 19 of the absolute address corresponding to the page address of the logical address.

The buffer storage TAG1 and the buffer storage DATA consist of four WAYs 0 to 3 each of which has the logical address bits 18 to 25 as the line address. Each entry of the buffer storage DATA has 64 byte data. Further, each entry of the buffer storage TAG1 has a valid bit (V) indicating validity of the entry, an exclusive control bit (E), a conversion bit (C) and absolute address bits 01 to 19 indicating the block address of the 64 bytes data of corresponding DATA portion.

When the exclusive control bit value is "0", the block is un-writable, and when this value is "1", the block is writable. When the conversion bit value is "0" the write operation is performed, and when the value is "1", the write operation is not performed.

The buffer TLB and the buffer storage TAG1 are simultaneously accessed by using the logical address of the T cycle of the register TLAR. The logical address bits 01 to 11 read from the "PRIMARY" and the "ALTERNATE" of the buffer TLB are compared with the logical address bits 01 to 11 of the register TLAR by a comparator. In this case, the logical address and the valid bit V which is "1" is determined as the WAY which the TLB matching operation is performed. When both have no TLB matching operation, the logical address is converted to the absolute address by means of an address conversion means (not shown), and the result is registered in the buffer TLB. Further, the comparator compares the absolute address bits 01 to 19 read from the WAY of the buffer storage TAG1 with the absolute address bits 01 to 19 read from the "PRIMARY" and "ALTERNATE" of the buffer TLB.

In this case, during the time that the TLB matching is performed when the value of the absolute address is compared and the valid bits (V) of the buffer storage TAG1 is "1" the TAG matching is performed. The OR circuit performs the OR calculation of the TAG match signal for the "PRIMARY" and "ALTERNATE" in each WAY, and the result is set to one of four match registers WAY 0 to 3. After the above process, when the desired data is hit in the fetch access, signals of the match registers WAY 0 to 3 are input to the WAY selection circuit, and bits 18 to 25 are input to the buffer storage DATA as the address of the register BLAR. Further, the data is selected and aligned from the WAY 0 to 3, and set to the read register so that the read operation is completed (in this case, the selected 64 bytes data are aligned to the eight bytes data in the read register). When data is not hit or found during TAG matching, the move-in request is sent to the MCU.

Figure 5:
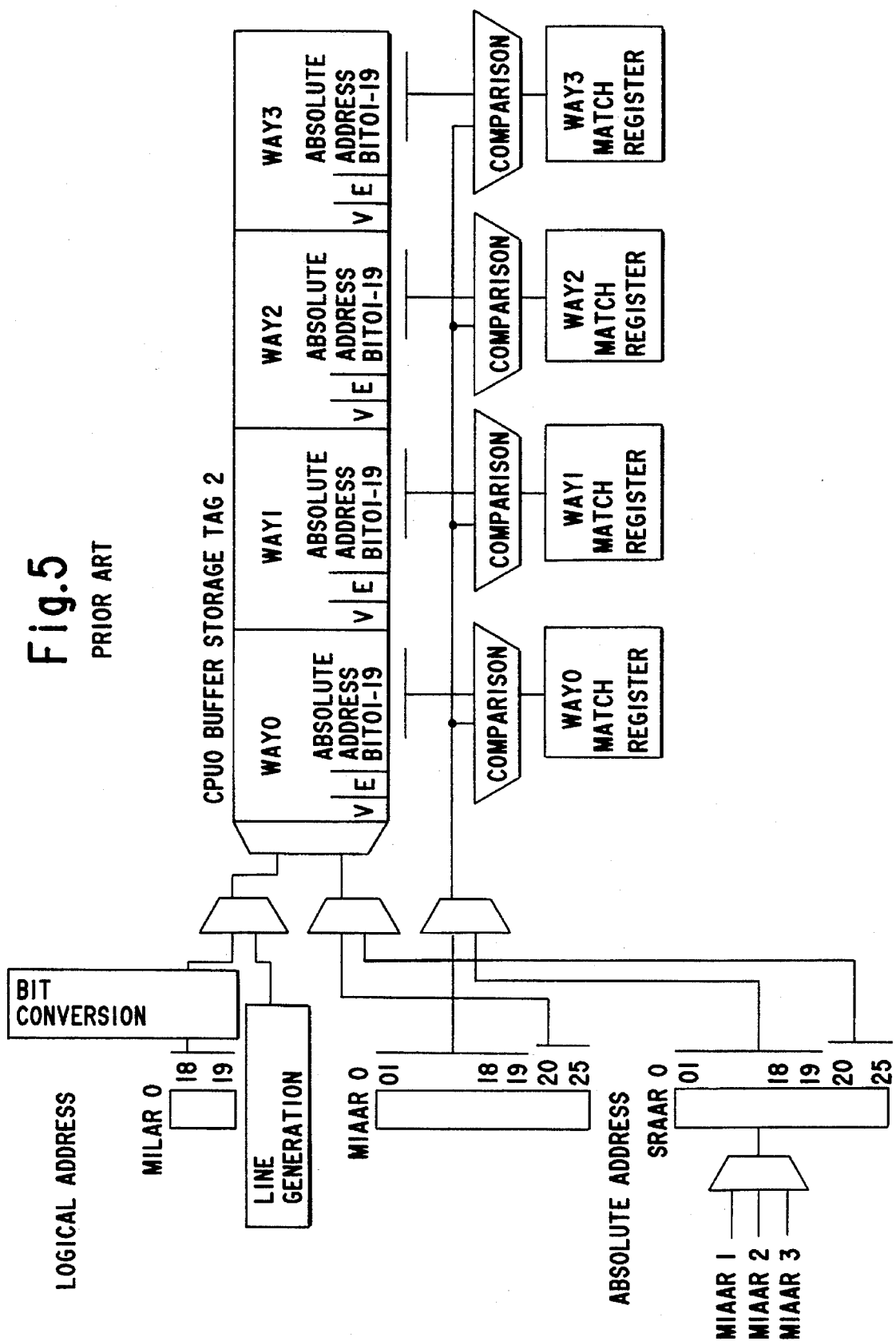
FIG. 5 is one example of a TAG2 in the MCU of a conventional art.

FIG. 5 shows the buffer storage TAG2 corresponding to the CPU0 and the peripheral circuits. When CPU0 sends the access request regarding the buffer storage to the MCU, and when another CPU sends the access request regarding the buffer storage to the MCU, the buffer storage TAG2 for the CPU0 is accessed. When there is the access request regarding the buffer storage from the CPU0, the absolute address bits 01 to 25 are set to the MIAAR0, and the logical address bits 18 and 19 are set to the MILAR0. The bit conversion circuit generates the basic line address for the requested address from the CPU0 (passing through bits 18 and 19), or sequentially converts the logical address bits 18 and 19 to generate the synonymic line address (total three patterns). The line generation circuit sequentially generates the basic line address and the synonymic line address to the request address from another CPU.

For example, when the CPU0 issues the move-in request (exclusive type move-in request), the MCU receives this request, and sets the logical address and the absolute address to the MILAR0 and the MIAAR0. The CPU0 buffer storage TAG2 sends the buffer invalid (BI) request to the CPU0 when the S type block (only fetch operation is allowed) is matched in the synonymic line address. At that time, address bits 01 to 25 of the MIAAR0 and address bits 18 and 19 of the bit conversion circuit are sent to the CPU.

When the CPU receives the BI request, since the access line of the buffer storage TAG1 is determined based on address bits 20 and 25 from the MIAAR0 of the MCU and address bits 18 and 19 from the bit conversion circuit, the CPU performs invalidation of the block to the WAY which address bits 01 to 19 from the MIAAR0 of the MCU coincides with the absolute address bit read from the buffer storage TAG1. After invalidation, the CPU informs the BI completion information to the MCU.

Problems of the above conventional art are explained below. In a buffer storage control method of the conventional art, when applying the conventional art to the central processing apparatus which has the pipe line for the instruction access and the pipe line for the operand access, since the instruction access is only a fetch access, the instruction buffer storage (below, IF buffer storage) has the shared block (only reference). Further, since the operand access has the fetch access and the store access, the operand buffer storage (below, OP buffer storage) has the shared type block and the exclusive type block.

When the operand store rewrites the instruction area, after rewrite, the instruction are executed as explained below.

(1) The block of the store destination is moved into the OP buffer storage as the exclusive type block, after the store access is performed to this block, when the instruction fetch request is input from the calculation control unit (I unit), the shared type move-in request is sent to the MCU since data is not stored in the buffer storage.

(2) When the MCU receives this request, it retrieves the TAG2 of the MCU for the OP buffer storage, detects the TAG matching of the exclusive type block, and sends the invalid type move-out request for the OP buffer storage to the CPU.

(3) When the CPU receives this request, it performs invalidation of the block after the CPU sends designated data of the OP buffer storage to the MCU.

(4) When the move-out data is sent from the CPU, the MCU sends the data to the CPU as the move-in data of the instruction buffer IF.

(5) When the CPU receives the move-in data, the data is moved into the IF buffer storage as the shared type block. In this case, when rewriting the instruction to the same block and executing the instruction, the following operations occur between the CPU and the MCU: the exclusive type MI request of the OP is sent from the CPU to MCU; next the BI request of the IF is sent from the MCU to the CPU; next the BI completion of the IF is sent from the CPU to the MCU; next the exclusive type MI is sent from the MCU to the CPU; next the shared type MI request of the IF is sent from the CPU to the MCU; next the invalid type MO request of the OP is sent from the MCU to the CPU; next the MO of the OP is sent from the CPU to the MCU; and finally the shared type MI of the IF is sent from the MCU to the CPU.

As explained above, in the above explained conventional buffer storage control method, when the same blocks including the exclusive type block are not simultaneously provided to a plurality of pipe lines, a lot of data is sequentially transferred between the CPU and the MCU in execution of the instruction train so that performance is degraded.

Another method is proposed in which the same block is provided on the OP buffer storage as the exclusive type block and is provided on the IF buffer storage as the shared type block. In this case, when the store operation is performed to the OP buffer storage, the retrieval is performed as to whether or not the same block is provided on the IF buffer storage. When the result is YES, it is necessary to perform the store operation to the IF buffer storage. According to the above explained conventional art, the retrieval for the IF buffer storage is performed by using the buffer storage TAG1, but the same block is not always registered on the same line. That is, since the logical address bits 18 and 19 at the operand access is different from the logical address bits 18 and 19 in the instruction access so that the same block may be designated, it is necessary to retrieve four patterns by changing the address bits 18 and 19.

In general, the access to the IF buffer storage of the operand store is performed through the store buffer for temporarily holding the store data. In this case, when four retrievals to the TAG1 of the IF buffer storage are performed for one operand store, the store buffer is immediately filled with data when the store operation is continued so that it is necessary to interrupt the pipe line process.

Accordingly, the object of the present invention is to solve the above problems. In particular, the TAG1 in the CPU is retrieved by using a basic line address consisting of a part of the page address and a part of the byte index. When data is mis-hit or not found using the TAG1, the TAG2 in the MCU is retrieved by the synonymic line address so that the unuseful data transfer between the CPU and the MCU, and the unuseful pipe line process to retrieve the synonymic line address at the store access in the CPU are not done as in the prior art.

Figure 6A:
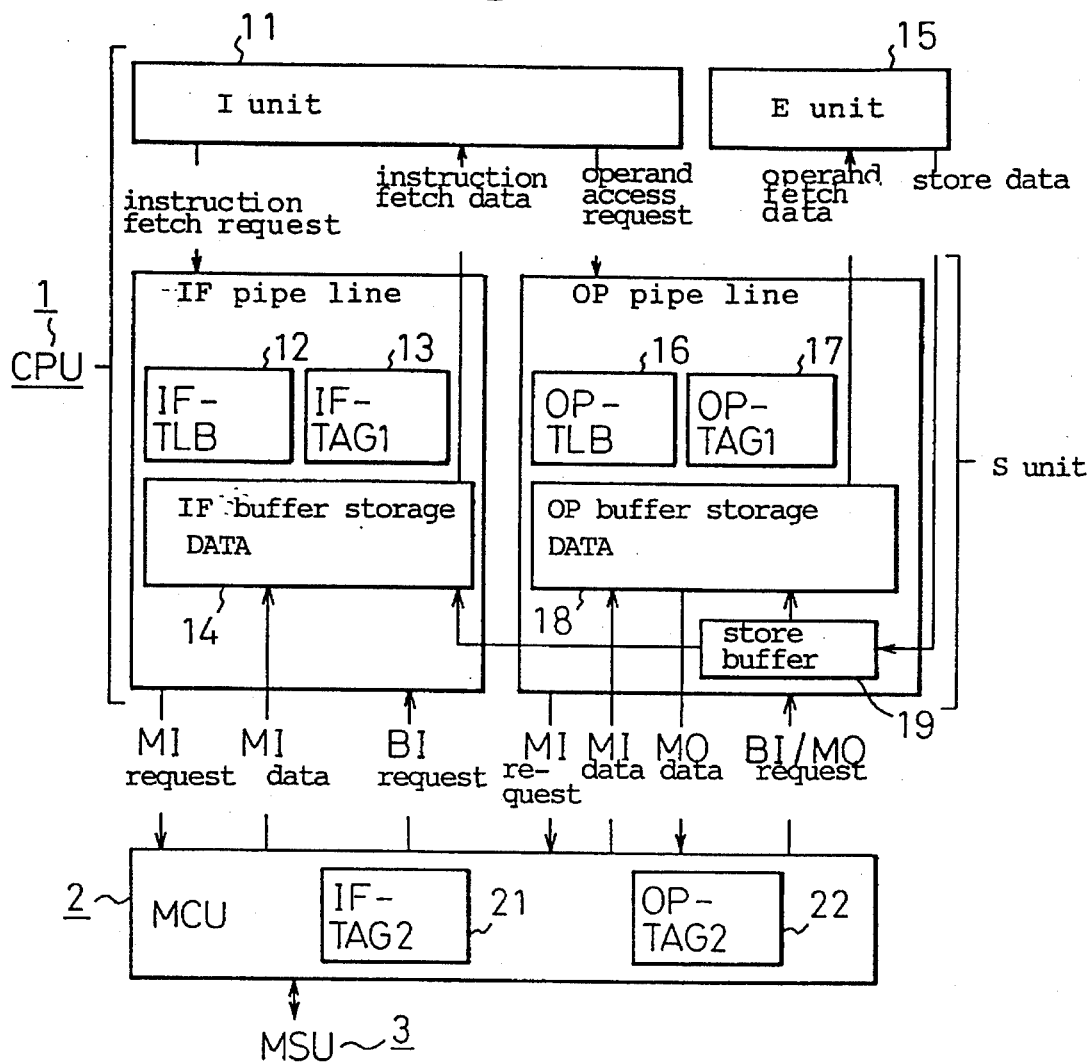
FIG. 6A is a principle block diagram of the present invention.

The present invention will be explained in detail below. FIG. 6A is a principle block diagram of the present invention. In FIG. 6A, TAG1 (for example, IF-TAG1-13 and OP-TAG1-17) is provided for detecting the hit/mis-hit for the basic line address consisting of a part of the page address and a part of the byte address of the logical address. The DATA (for example, IF buffer storage DATA 14 and the OP buffer storage DATA 18) retrieves the TAG1 (IF-TAG1-13 and OP-TAG1-17) for plural pipe lines in the CPU by means of the basic line address, and holds the data when the data is hit or found. The TAG 2 (for example, IF-TAG2-21 and OP-TAG2-22) is retrieved by the hit/mis-hit by using the synonymic line address which the variable portions (for example, bits 18 and 19) of the basic line address are changed.

In the present invention, the TAG1 in the CPU (for example, IF-TAG1-13 and OP-TAG1-17) is retrieved by using the basic line address consisting of a part of the page address and a part of the byte index, and the DATA (for example, IF buffer storage DATA 14 and the OP buffer storage DATA 18) is accessed when the data is hit. The TAG2 in the MCU2 (for example, IF-TAG2-21 and OP-TAG2-22) is retrieved by the synonymic line address when the data is mis-hit, and the DATA is invalidated when the data is hit, the move-in operation is validated.

Accordingly, the TAG1 in the CPU1 is retrieved by only the basic line address, and the TAG2 in the MCU2 is retrieved by the synonymic line address when the data is mis-hit. Accordingly, it is possible to delete an unuseful data transfer between the CPU and the MCU, or to delete an unuseful pipe line process for retrieving the synonymic line address at the store access in the CPU.

Next, the structure and operation of the present invention will be explained with reference to FIGS. 6 to 8, and embodiments are explained in detail with reference to FIGS. 9 to 13. The following explanation are in the case of IF-TAG1-13 for performing the fetch access, and in the case of the OP-TAG1-17 for operating the fetch access and the store access as plural TAG1 portions.

In FIG. 6A, the CPU1 is formed by the I unit 11 (calculation control unit), and the E unit (calculation execution unit), the S unit (storage control unit). The S unit is formed by the IF-TLB-12, the IF-TAG1-13, the IF buffer storage DATA 14, the OP-TLB-16, the OP-TAG1-17, the OP buffer storage DATA 18, and the store buffer 19. The IF pipe line performs the pipe line process for the fetch access of the IF (instruction) in accordance with the order of the P cycle, the T cycle, the B cycle, and the R cycle.

Figure 10:
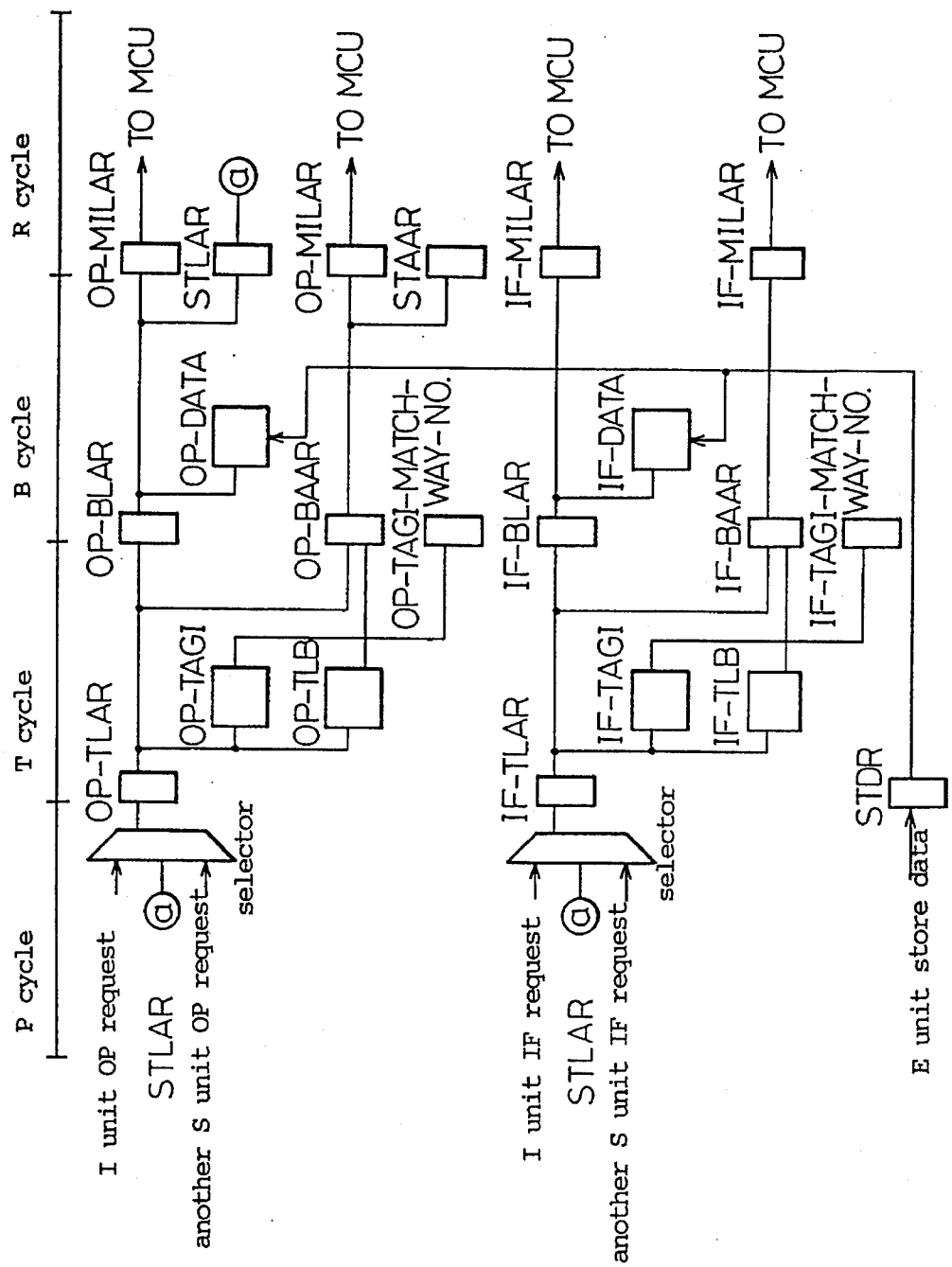
FIG. 10 is one example of an S unit according to the present invention.

The IF-TLB-12 is a table for a high speed conversion from the logical address to the absolute address to perform the fetch access of the instruction IF (see, FIG. 10). When the IF-TAG1-13 performs the fetch access to the IF (instruction), it determines as to whether or not the data is registered in the IF buffer storage DATA 14, i.e., the hit/mis-hit of data is performed, by retrieving based on the basic line address (see, a flowchart of FIG. 7). The IF buffer storage DATA 14 is retrieved by the IF-TAG1-13 and the data is read when the data is hit.

The OP pipe line performs the pipe line process of the fetch access and the store access of the operand (OP) in accordance with the order of the P cycle, the T cycle, the B cycle, and the R cycle. The OP-TLB-16 is the table for converting from the logical address to the absolute address to perform the fetch access and the store access for the OP (see, FIG. 10). The OP-TAG1-17 determines as to whether or not the data is registered in the OP buffer storage DATA 18, i.e., the hit/mis-hit of data is performed, when the OP-TAG1-17 performs the fetch access and the store access, by retrieving based on the basic line address (see, a flowchart of FIG. 8).

The OP buffer storage DATA 18 is provided for reading the data when retrieving the OP-TAG1-17 and the data is hit. The store buffer 19 is provided for temporarily storing the store data. The MCU 2 is the main storage control unit, and accesses and controls the MSU (main storage) 3 in response to the MI request (move-in request) and the MO request (move-out request) from the S unit, and transfers the data. In this embodiment, the IF-TAG2-21 and the OP-TAG2-22 are provided for determining the hit/mis-hit of data by the synonymic line address (see, flowcharts of FIGS. 7 and 8).

Figure 6B:
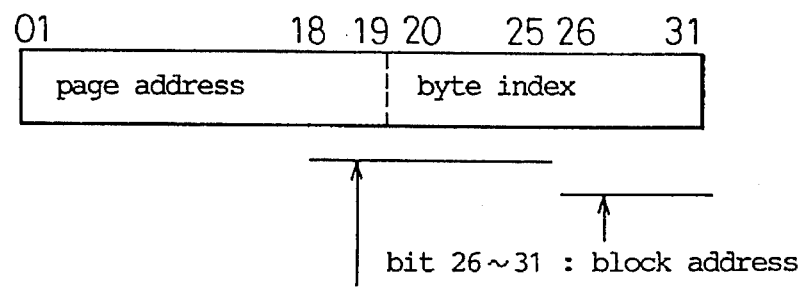
FIG. 6B is a structural view of an address format.

FIG. 6B is one example of an access address of the buffer storage (TAG1, TAG2, DATA). The page address is given by bits 01 to 19, and the byte index is given by bits 20 to 31. Further, the block address is given by bits 26 to 31. The buffer storage (IF-TAG1-13, IF buffer storage DATA-14, OP-TAG1-17, 0P buffer storage DATA-18, IF-TAG2-21 and OP-TAG2-22) accesses by using bits 18 to 25, i.e., by using a part of the page address (bits 18 and 19) and a part of the byte index (bits 20 to 25).

Accordingly, in the present invention the IF-TAG-13 and the OP-TAG1-17 in the S unit of the CPU1 are retrieved by using the basic line address, and determine the hit/mis-hit of data. The IF-TAG-21 and OP-TAG2-22 in the MCU2 are retrieved by the synonymic line address except for the basic line address (three addresses converted from the bits 18 and 19 of the basic line address, or four addresses for the requested address from another CPU). When the data is hit, the IF-TAG1-13 or OP-TAG1-17 is invalidated (the move-out (MO) and move-in (MI) operation for the data maybe performed).

Figure 7:
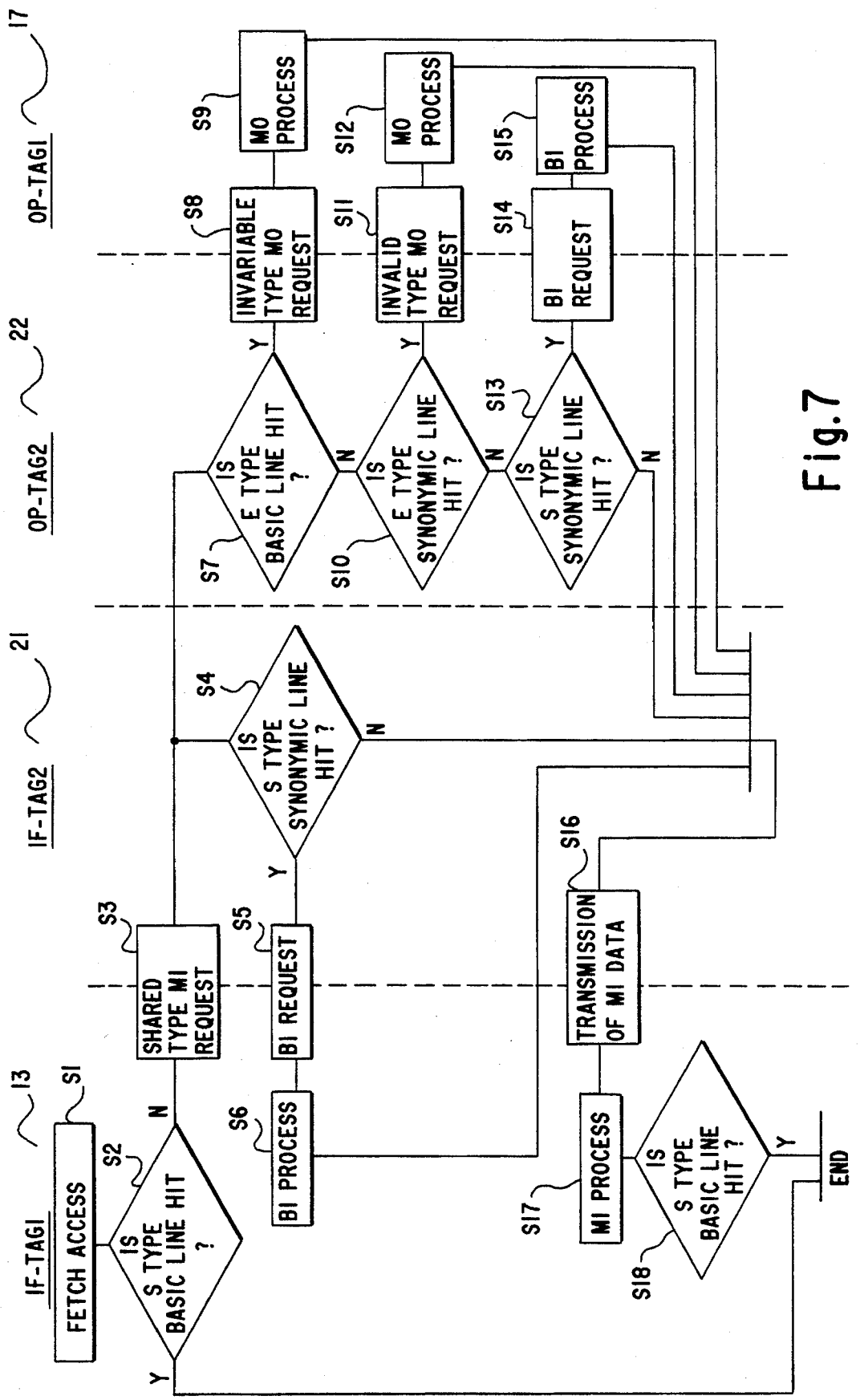
FIG. 7 is a flowchart in a shared type move-in request from an IF pipe line according to the present invention.

FIG. 7 is a flowchart at a shared type move-in request from the IF pipe line according to the present invention. That is, this flowchart is in the case of the fetch access from the IF pipe line of the S unit as the shared type move-in request in FIG. 6A. In FIG. 7, the fetch access occurs in step S1. In step S2, the IF-TAG1-13 determines as to whether or not the S type (shared type) is hit for the basic line address. The IF-TAG1-13 of FIG. 6A is retrieved by using the basic line address, and determines as to whether or not the data is hit by the S type (shared type). When the result is YES, since it is clarified that the data exists based on the basic line address, the data (in this case, it is an instruction) by the basic line address is read therefrom, and transfers it to the source of the fetch access request (for example, I unit 11 of FIG. 6A).

On the other hand, when the result is NO, since the data does not exist based on the basic line address, the process goes to the step S3. In step S3, the shared type MI request is issued. That is, since the S unit of FIG. 6A retrieves the IF-TAG1-13 by the basic line address when the step S2 is YES, and detects that the data is mis-hit, the S unit issues the shared type MI request for the MCU2.

In step S4, the IF-TAG2-21 determines whether or not the S type (shared type) is hit for the synonymic line address. That is, in response to the MI request in step S3, the IF-TAG2-21 in the MCU2 is retrieved for three sets of synonymic line addresses generated from bits 18 and 19 in the basic line address to determine the hit/mis-hit of data. When the data is hit by any one of the synonymic line addresses, the step S4 becomes YES, in step S5, the BI request (invalid request) is informed to the IF-TAG1-13, in step S6, the entry of the IF-TAG1-13 is invalidated (i.e., the valid bit is reset to "0"). On the other hand, when data for all synonymic line addresses are mis-hit, since it is clarified that the data does not exist based on the basic line address and the synonymic line address, the process goes to the step S16.

In step S7, for the OP-TAG2-22 of the MCU2 which is received by the shared type MI request in step S3, a determination is performed as to whether or not the basic line address is hit by the E type (exclusive type). When the result is YES, the unchangeable type MO request is provided to the OP-TAG1-17 of the S unit in step S8, the data of the OP buffer storage DATA-18 is moved without invalidation of the OP-TAG1-17 in step S9 (i.e., the data is transferred and stored in the MSU3 through the MCU2), and the process goes to the step S16. When the result is NO, the process goes to the step S10 since the data is mis-hit.

In step S10, the OP-TAG2-22 determines as to whether or not the synonymic line address is hit by the E type (exclusive type). When the result is YES, the invalid type MO request is informed to the OP-TAG1-17 of the S unit in step 11, after the data is moved from the OP buffer storage DATA-18 in step 12, and the entry of the OP-TAG1-17 is invalidated and the process goes to the step S16. When the result is NO, the process goes to the step S13.

In step S13, the OP-TAG2-22 determines whether or not the synonymic line address is hit by the S type (shared type). When the result is YES, the BI request is provided to the OP-TAG1-17 of the S unit in step S14, the entry of the OP-TAG1-17 is invalidated in step S15. On the other hand, when the result is NO, the process goes to the step S16. In step S16, the retrieval of the hit/mis-hit, invalidation and move-out operation of the OP buffer storage DATA-18 are performed in the IF-TAG1-13, the OP-TAG1-17, the IF-TAG2-21, and the OP-TAG2-22. When the data of the fetch access does not exist, the MI data is transferred (i.e., data is transferred from the MSU2 to the S unit), in step S17, the MI process (the data is stored in the IF buffer storage DATA-14, and the address of the data is registered into the IF-TAG1-13), the data of the fetch access is registered and the process goes to the step S18.

In step S18, the IF-TAG1-13 registers the fetch access in step S17, and the IF-TAG1-13 is retrieved. The data is read from the IF buffer storage DATA-14, and transferred to the fetch access source (i.e., I unit).

As explained above, in response to the fetch access from the access request source, for example, the I unit, the IF-TAG1-13 is retrieved by the shared type. When the data is hit, it is transferred from the IF buffer storage DATA-14 to the fetch access source. On the other hand, when the data is mis-hit, the shared type MI request is informed to the MCU2. The IF-TAG2-21 is retrieved by the shared type of the synonymic line address (i.e., address changed from bits 18 and 19), and the entry of the IF-TAG1-13 is invalidated as follows.

(1) The OP-TAG2-22 is retrieved by the exclusive type of the basic line address. When the data is hit, after the data of the OP buffer storage DATA-18 is moved-out without invalidation of the OP-TAG2-22, the data is moved from the MSU3 to the IF buffer storage DATA-14.

(2) The OP-TAG2-22 is retrieved by the exclusive type of the synonymic line address. When the data is hit, after the data of the OP buffer storage DATA-18 is moved to the MSU3, and the entry of the OP-TAG1-17 is invalidated, the data is moved from the MSU3 to the IF buffer storage DATA-14.

(3) The OP-TAG2-22 is retrieved by the shared type of the synonymic line address. When the data is hit, after the entry of the OP-TAG1-17 is invalidated, the data is moved from the MSU3 to the IF buffer storage DATA-14.

(4) The OP-TAG2-22 is retrieved by the basic line address and the synonymic line address, and any operation is not performed when the data is mis-hit. The data from the MSU3 is moved to the IF buffer storage DATA-14.

Next, after any of these steps (1) to (4) is performed, the data is transferred from the IF buffer storage DATA-14 to the fetch access source (I unit). After these processes, the IF-TAG1-13 is retrieved by only basic line address of the CPU1. When the data is mis-hit, the IF-TAG2-21 of the MCU2 is retrieved by the synonymic line address so that it is possible to delete the unuseful data transfer between the CPU and the MCU.

Figure 8:
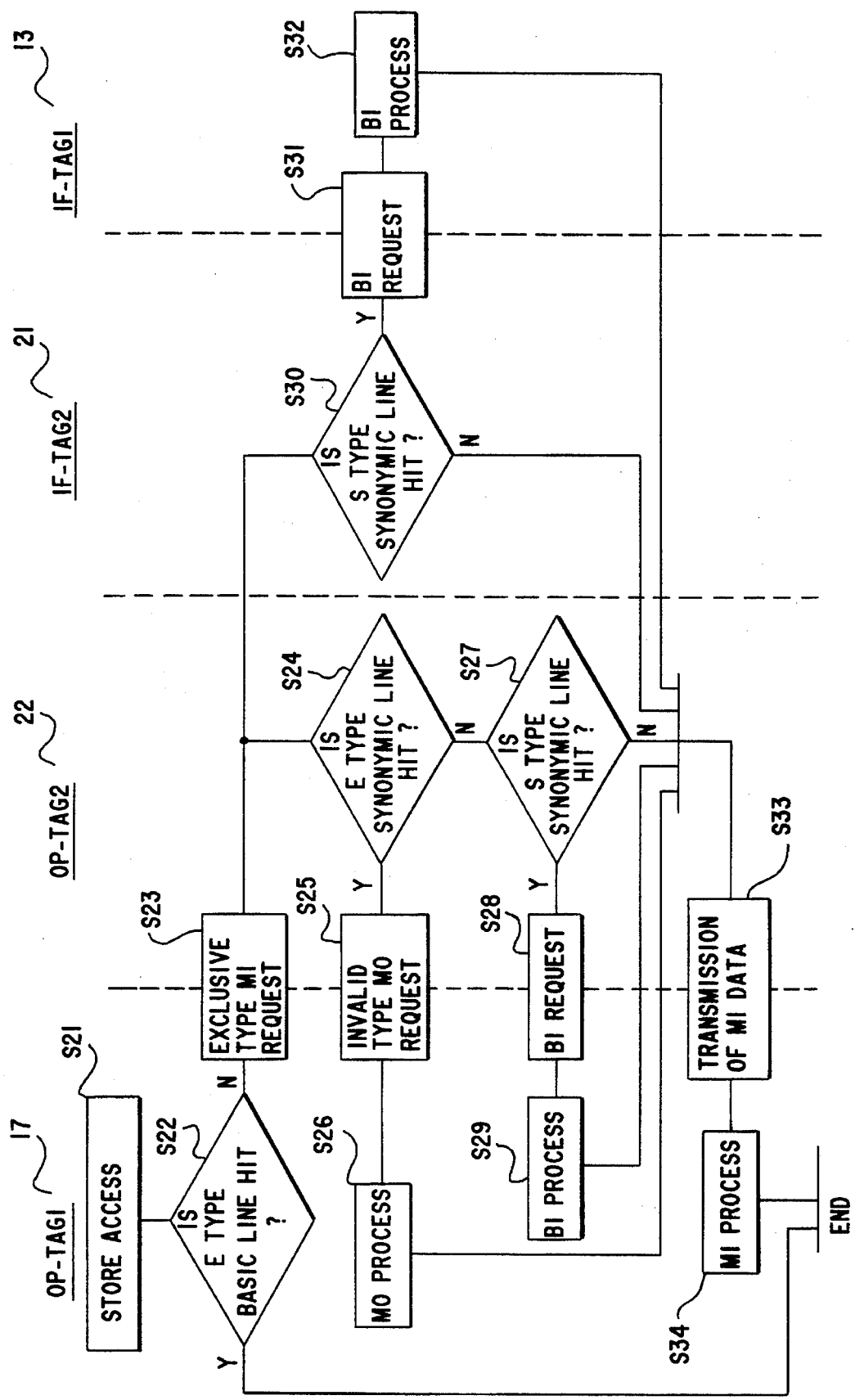
FIG. 8 is a flowchart in an exclusive type move-in request from an OP pipe line according to the present invention.

FIG. 8 is a flowchart at an exclusive type move-in request from the OP pipe line. This is in the case of the store access from the OP pipe line of the S unit in FIG. 6A as the exclusive type move-in request. In FIG. 8, the store access is requested in step S21.

In step S22, the OP-TAG1-17 determines as to whether or not the E type (exclusive type) is hit by the basic line address. That is, the OP-TAG1-17 is retrieved by the basic line address to determine the E type (exclusive type) of the basic line address. When the result is YES, since it is clarified that the data for the basic line address exists, the store data is written into the OP buffer storage DATA-18. On the other hand, when the result is NO, since it is clarified that the data does not exist for the basic line address, the process goes to the step S23.

The exclusive type MI request is issued in step S23. Since the S unit of FIG. 6A retrieves the OP-TAG1-17 by the basic line address when the step S22 is YES and detects the mis-hit of the data, it issues the exclusive type MI request to the MCU2. In step S24, the OP-TAG2-22 determines as to whether or not the E type (exclusive type) is hit by the synonymic line address. In response to the MI request in step S23, for three sets of synonymic line addresses generated by change of bits 18 and 19 (a part of the byte index) of the basic line address, the OP-TAG2-22 is retrieved and a determination is made as to whether or not the data is hit.

When the data is hit by any one of synonymic line addresses, the step 24 is YES, the invalid type MO request is provided to the OP-TAG1-17 in step S25, and the data of the OP buffer storage DATA-18 is moved (i.e., the data is transferred and stored in the MSU3 through the MCU2) in step S26, and the entry of the OP-TAG1-17 is invalidated. The process goes to the step S33. On the other hand, when the result is NO (i.e., in the E type, the data is mis-hit for all synonymic line addresses), the process goes to the step S27.

In step S27, the OP-TAG2-22 determines as to whether or not the data is hit by the S type (shared type) of the synonymic line address. That is, since the data is mis-hit by the E type (exclusive type) of the synonymic line address in step S24, next, a determination is made as to whether or not the data is hit by the S type (shared type) of the synonymic line address. When the data is hit by any one of synonymic line addresses, the step S27 is YES, and the BI request is provided to the OP-TAG1-17 in step S28, further, the entry of the OP-TAG1-17 is invalidated in step S29. Then, the process goes to the step S33. On the other hand, when the result is NO, since the data is mis-hit by both E type (exclusive type) and the S type (shared type) of the synonymic line address, it is clarified that the data for the store access does not exist in the OP buffer storage DATA-18 so that the process goes to the step S33.

In step S30, for the IF-TAG2-21 of the MCU2 received the MI request of the exclusive type in step 23, a determination is made as to whether or not the data is hit by the S type (shared type) of the synonymic line address. When the result is YES, the BI request is informed to the IF-TAG1-13 of the S unit in step S31, the entry of the IF-TAG1-13 is invalidated in step S32, and the process goes to the step S33. On the other hand, when the result is NO, the process goes to the step S33.

In step S33, the retrieval of the hit/mis-hit of data, the invalidation and move-out operation of the OP buffer storage DATA-18 may be performed for the OP-TAG1-17, the OP-TAG2-22, the IF-TAG2-21 and the IF-TAG1-13. When the data of the store access (in this case, it is the operand) does not exist, the MI data is transferred (the data is transferred from the MSU2 to the S unit), the MI process (i.e., store into the OP buffer storage DATA-18, registers the address into the OP-TAG1-17, and turns on the V bit (valid bit) and E bit (exclusive bit)) is performed in step S34. After the above steps, the data for the store access is stored in the OP buffer storage DATA-18.

Based on the above process, in response to the store access from the store access source, for example, the I unit, the OP-TAG1-17 is retrieved by the exclusive type and when the data is hit, since the data exists in the OP buffer storage DATA-14, the data is written thereinto. On the other hand, when the data is mis-hit, the MI request of the exclusive type is provided to the MCU2.

(1) The OP-TAG2-22 is retrieved by the exclusive type of the synonymic line address (i.e., address changed from bits 18 and 19) and when the data is hit, the data in the OP buffer storage DATA is moved and the entry in the OP-TAG1-13 is invalidated.

(2) The OP-TAG2-22 is retrieved by the shared type of the synonymic line address and when the data is hit, the entry of the OP-TAG1-13 is invalidated.

(3) The OP-TAG2-22 is retrieved by the exclusive type and the shared type of the synonymic line address and when the data is mis-hit, the above processes are not performed.

(4) The IF-TAG2-21 is retrieved by the shared type of the synonymic line address and when the data is hit, the IF-TAG1-13 is invalidated.

(5) The IF-TAG-2-21 is retrieved by the shared type and when the data is mis-hit, the above processes are not performed.

Next, after any one of the steps (1), (2), and (3), and any one of steps (4) and (5), are performed, further, the data of the store access from the MSU2 is moved to the MSU3, the store data (temporarily stored in the store buffer 19 of FIG. 6A) is written into the address of the store access of the OP buffer storage DATA-18. Based on the above processes, the OP-TAG1-17 of the CPU1 is retrieved by the basic line address. When the data is mis-hit, the OP-TAG2-22 and the IF-TAG2-21 in the MCU2 are retrieved based on the synonymic line address. Further, the MO process, the BI process, the MI process, and the write of the store data are performed so that it is possible to delete the unuseful data transfer between the CPU and the MCU. Further, it is possible to delete the unuseful pipe line process for retrieving the synonymic line address within the CPU.

Figure 9:
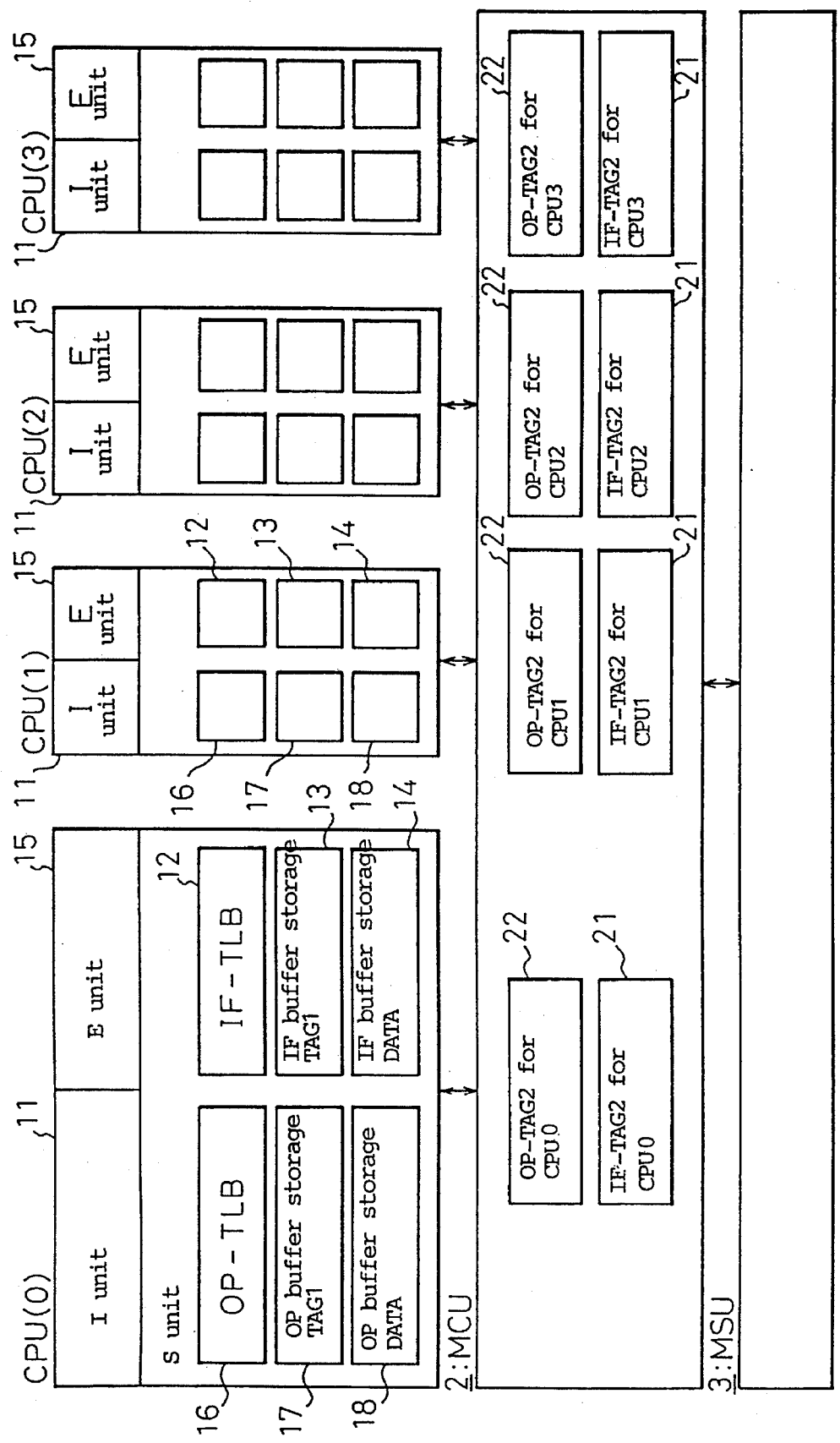
FIG. 9 is a structural view according to an embodiment of the present invention.

Next, various examples of circuits and operation are explained with reference to FIGS. 9 to 13. In FIG. 9, each of CPU (0) to (3) has the same structure of the CPU1 of FIG. 6A, and these CPUs perform parallel processing. Each of CPU (0) to (3) has two pipe lines, i.e., the IF pipe line and the OP pipe line. As explained above, these CPUs perform the fetch access of the instruction (see, a flowchart of FIG. 7) and the fetch/store access of the operand (see, a flowchart of FIG. 8).

The MCU2 is a main storage control apparatus. The OP-TAG2-22 for the CPU0 is provided for the OP buffer storage TAG1-17 of the CPU (0), and IF-TAG2-21 for the CPU0 is provided for the IF buffer storage TAG1-13. The same structures are provided for the CPU (1) to (3). In addition to the flowcharts of FIGS. 7 and 8, the CPU (1) to (3) are also retrieved, and determine as to whether or not the data is hit. Further, these CPUs perform the invalidation, move-in operation, and move-out operation, if it is necessary. The MCU3 is a main storage apparatus, and accessed in common by the CPU (0) to (3).

FIG. 10 is one example of circuit of the S unit provided in the CPU (0) to (3). The P cycle, the T cycle, the B cycle, and the R cycle denote the stages of the pipe line within the CPU. In this embodiment, two pipe lines, i.e., the pipe line of the operand access for the store access, and the pipe line of the instruction access for the fetch access, are provided (only one pipe line is provided in the conventional art as shown in FIGS. 1 and 2). The OP-TAG1 corresponds to the OP-TAG1-17 of FIG. 6A. The IF-TAG1 corresponds to the IF-TAG1-13 of FIG. 6A. Further, the OP-TLB corresponds to the OP-TLB-16 of FIG. 6A, and this is a table for converting the logical address to the absolute address with high speed. The IF-TLB corresponds to the IF-TLB-12 of FIG. 6A, and this is a table for converting the logical address to the absolute address with high speed.

The OP-TAG-MATCH-WAY-NO is a register for holding the WAY number having TAG matching as a result of retrieval of the OP-TAG1 (OP-TAG1-17 of FIG. 6A). The IF-TAG-MATCH-WAY-NO is a register for holding the WAY number having TAG matching as a result of retrieval of the IF-TAG1 (IF-TAG1-13 of FIG. 6A). The STAR is a register for holding the logical address in the operand store. The outputs of these registers are input to a selection circuit for selecting the address of the operand pipe line and the instruction pipe line.

The STAAR is a register for holding the absolute address in the operand store. These outputs are input to the IF buffer storage TAG1 and the IF buffer storage DATA in the process for the IF buffer storage of the operand store. The STDR is a register (see, store buffer 19 of FIG. 6A) for holding the store data from the E unit. In this case, OP-TAG1-MATCH-WAY-NO, IF-TAG1-MATCH-WAY-NO, STLAR, STAAR, and STDR are a set of store buffers provided of one operand store.

Figure 11:
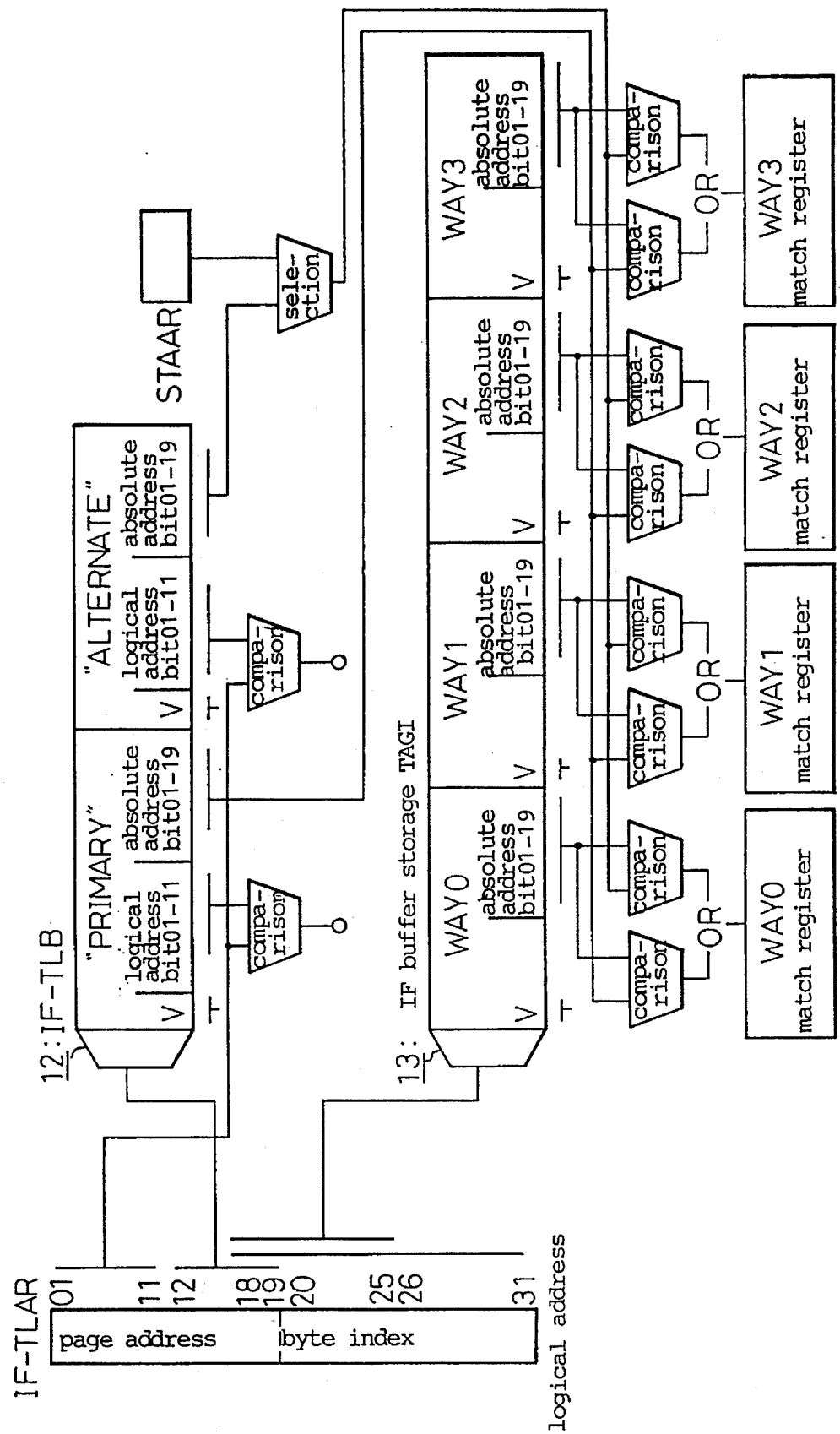
FIG. 11 is one example of a TAG1 in the CPU according to the present invention.

FIG. 11 is one example of circuit of TAG1 in the CPU. This circuit corresponds to the circuit of the instruction pipe line shown in the lower portion of FIG. 10.

(1) The logical address for the fetch access of the instruction is set to the IF-TLAR (see, step S1 of FIG. 7).

(2) The IF buffer storage TAG1-13 is retrieved by the shared type of the address (basic line address) of eight bits consisting of a part of the page address (bits 18 and 19) and a part of the byte index (bits 20 to 25) of the logical address.

(3) At the same time of the step (2), the IF-TLB-12 is retrieved by the lower address (bits 12 to 19) of the page address of the logical address, the result is compared with the upper address of the logical address (bits 01 to 11) by a comparator, and a match signal is generated when the former coincides with the latter.

(4) The absolute address from the IF buffer storage TAG1-13 retrieved by the step (2) is compared with the absolute address "PRIMARY", "ALTERNATE" (or, absolute address set to the STAAR of the operand pipe line) by the comparator. When the former coincides with the latter, the value "1" is set to any one of match registers WAY 0 to 3.

Based on the above processes, when performing the fetch access of the instruction and fetch/store access of the operand, the IF buffer storage TAG1-12 is retrieved and the hit/mis-hit of data is determined (detailed operation is shown by the flowchart of FIGS. 7 and 8).

Figure 12:
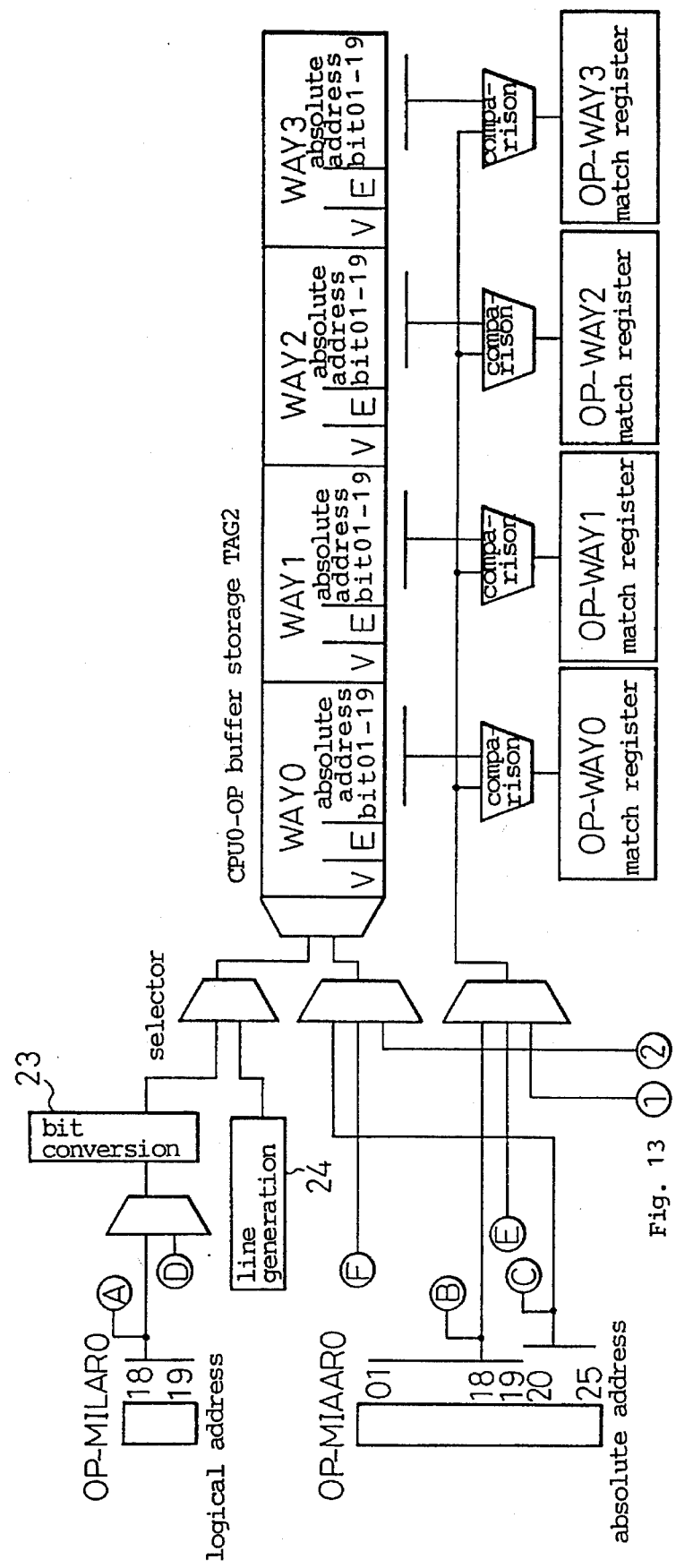
FIG. 12 is one example of the TAG2 in the MCU of a conventional art (No. 1)

FIGS. 12 and 13 show examples of the TAG2 in the MCU of the present invention. These drawings show examples of CPU0-OP buffer storage TAG2 provided in the MCU2 for CPU (0). The same structure is provided in the CPU (1) to (3). In FIGS. 12 and 13, the OP-MIAAR0 is a register for setting the absolute address (bits 01 to 25) from the CPU (0).

The OP-MILAR0 is a register for setting the variable portion of the page address of the logical address, i.e., bits 18 and 19. The SRAAR0 is a register for setting the absolute address by using the selector. The bit conversion circuit 23 is a circuit for passing through the basic line address, or generating three kinds of synonymic line addresses converted from the bits 18 and 19 of the basic line address (four kinds of synonymic line addresses when it is transferred from another CPU (1) to (3)). The line generation circuit 24 is a circuit for sequentially generating the synonymic line address (00, 01, 10, 11) to the requested address from another CPU (1) to (3).

(1) The absolute address is set to the OP-MIAAR0 (and SRAAR0), and bits 18 and 19 of the logical address is set to the OP-MILAR0.

(2) Total eight bits of bits 20 to 25 of the absolute address of the OP-MIAAR0 and bits 18 and 19 of the bit conversion circuit 23 or the line generation circuit 24 are read as the line address of CPU0-OP buffer storage TAG2, and bits 01 to 19 of the absolute address are repeatedly compared with the absolute address 01 to 19 from the OP-MIAAR0 (or SRAAR0 set by another CPU). Further, the CPU-IF buffer storage TAG2 is retrieved by the basic line address and the synonymic line address, a determination is made as to whether or not the matched WAY exists, and the result is input to the OP-WAY0 to WAY3 match registers.

Similarly, the IF-MIAAR0 is a register for setting the absolute address (bits 01 to 25) from the CPU (0). The IF-MILAR0 is a register for setting a variable portion of the page address of the logical address, i.e., bits 18 and 19. The SRAAR0 is a register for setting the absolute address by using the selector. The bit conversion circuit 25 is a circuit for passing through the basic line address, or generating three kinds of synonymic line addresses converted from the bits 18 and 19 of the basic line address (four kinds of synonymic line addresses when it is transferred from another CPU (1) to (3)). The line generation circuit 26 is a circuit for sequentially generating the synonymic line address (00, 01, 10, 11) to the requested address from another CPU (1) to (3).

(1) The absolute address is set to the IF-MIAAR0 (and SRAAR0), and bits 18 and 19 of the logical address is set to the IF-MILAR0.

(2) Total eight bits of bits 20 to 25 of the absolute address of the IF-MIAAR0 and bits 18 and 19 of the bit conversion circuit 24 or the line generation circuit 24 are read as the line address of CPU0-IF buffer storage TAG2, and bits 01 to 19 of the absolute address are repeatedly compared with the absolute address 01 to 19 from the IF-MIAAR0 (or SRAAR0 set by another CPU). Further, the CPU-IF buffer storage TAG2 is retrieved by the basic line address and the synonymic line address, a determination is made as to whether or not the matched WAY exists, and the result is set to the IF-WAY0 to WAY3 match registers.

Based on the above process, in the fetch access of the instruction and the fetch/store access explained by FIGS. 7 and 8, the CPU-OP buffer storage TAG2 and the IF buffer storage TAG2 are retrieved by the basic line address and the synonymic line address to determine the hit/mis-hit of data (see, flowchart of FIGS. 7 and S).

CAPABILITY OF UTILIZATION IN INDUSTRY

As explained above, according to the present invention, the TAG1 of the CPU1 is retrieved by the basic line address, when the data is mis-hit using TAG1, the TAG2 of the MCU2 is retrieved by the synonymic line address, and the invalidation of the TAG1, the move-out operation, and the move-in operation are provided. Accordingly, it is possible to delete the unuseful data transfer between the CPU and MCU, and to delete the unuseful pipe line process for retrieving the synonymic line address at the store access. Further, it is possible to achieve high speed memory access in the CPU having a plurality of pipe lines so that this invention can be widely utilized in the industry, particularly, in the field of a data processing system.

I claim:

1. A data processing apparatus formed by a plurality of central processing units, a main storage unit, and a main storage control unit provided between the central processing units and the main storage unit, the apparatus comprising:

each central processing unit including a) a calculation control unit for generating an instruction fetch request and an operand access request and for receiving an instruction fetch data, b) a calculation execution unit for generating a store data and for receiving an operand fetch data, and c) a storage control unit for receiving the instruction fetch request and the operand access request, the storage control unit including an instruction access pipe line for an instruction access and an operand access pipe line for an operand access, the instruction access pipe line including a) an address conversion buffer for converting from the logical address to the absolute address to perform the fetch access for the instruction with high speed, b) a tag portion for retrieving based on the basic line address at the fetch access of the instruction and for determining a hit/mis-hit of data, and c) a buffer storage data for the instruction access to read the data when the data is hit, the operand access pipe line including a) an address conversion buffer for converting from the logical address to the absolute address to perform the fetch access and store access of the operand, b) a tag portion for retrieving based on the basic line address at the fetch access and store access of the operand and for determining and hit/mis-hit of data, c) a buffer storage data for the operand access to read the data when the data is hit, and d) a store buffer for temporarily storing the store data, and the main storage control unit including a) a first tag portion for the instruction access for retrieving based on the synonymic line address at the fetch access of the instruction and for determining the hit/mis-hit of the data, and b) a second tag portion for the operand access for retrieving based on the synonymic line address at the fetch access and the store access of the operand and for determining the hit/mis-hit of the data.

* * * * *